No. 782,200. PATENTED FEB. 7, 1905.
K. KIEFER.
FILTER.
APPLICATION FILED MAY 4, 1903.
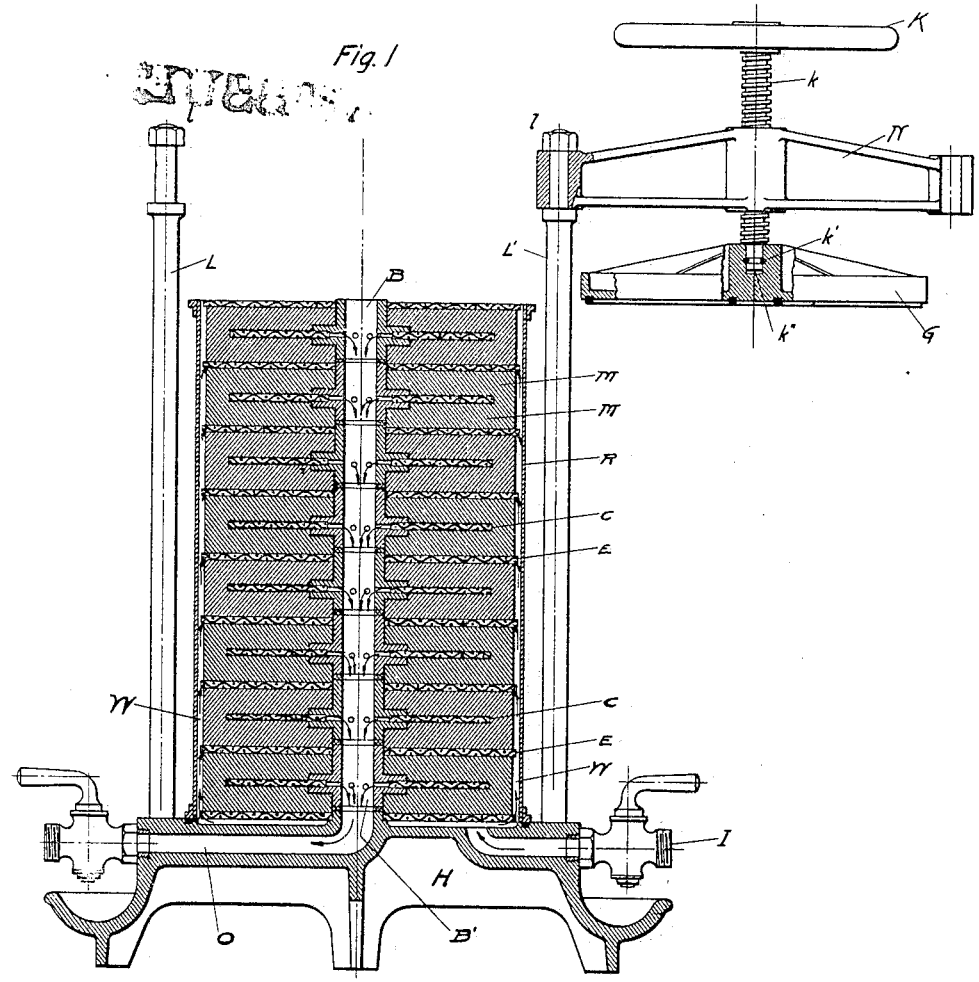
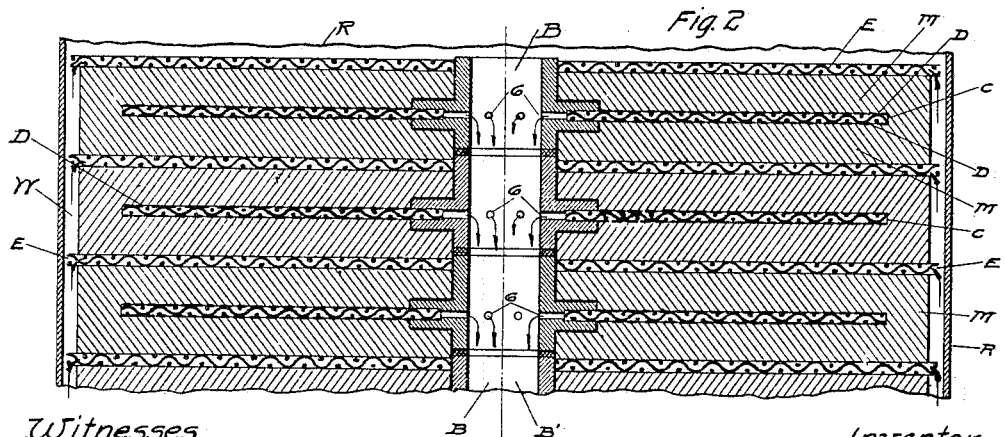
Witnesses
Inventor
Karl Kiefer No. 782,200. Patented February 7, 1905.

UNITED STATES PATENT OFFICE.

KARL KIEFER, OF CINCINNATI, OHIO.

FILTER.

SPECIFICATION forming part of Letters Patent No. 782,200, dated February 7, 1905.

Application filed May 4, 1903. Serial No. 155,674.

*To all whom it may concern:*

Be it known that I, KARL KIEFER, a citizen of the United States, and a resident of Cincinnati, in the county of Hamilton and State of Ohio, have invented certain new and useful Improvements in Filtering Apparatus for the Separation of Solids from Liquids, of which the following is a specification.

My invention relates to filters comprising a series of superimposed filter elements; and its novelty consists in the means of arranging the elements, assembling them, and securing them and their connections in place.

In my application for Letters Patent of the United States filed by me April 29, 1901, Serial No. 57,970, I described a filter comprising a series of superimposed filtering elements, capillary inlet and outlet liquid-ways, and means for supporting the filter elements. In that same application I describe, but do not claim, a novel means for securing the filter elements tightly in position after assembling same. I also describe, but do not claim, a novel modification of the filtering elements which form the subject-matter of this specification.

In the drawings, Figure 1 is a vertical central section of my improved filter. Fig. 2 is an enlarged section through some of the filter elements.

In the drawings each filter element is shown as composed of two layers M of filter mass, one arranged on each side of the horizontally-placed woven-wire screen C, provided with intermediate protecting-sheets D D of flannel or other suitable material. On each side of each filter element is arranged a horizontally-placed coarse woven-wire screen E. The screens C and E and the layers of pulp are supported from central hubs B, provided with projecting flanges which embrace and carry the screens. Each hub is provided with a central vertical opening B' and with radial passages 6 6, communicating with it and screen C.

R is an inclosing external drum, between which and the filter elements is a vertical annular inlet-passage W, communicating with screens E E, and hub B, that embraces and supports screens C C, and provided with passages 6 6, connected, by means of central opening B', with the outlet-passage O on the base plate or platform H, made of cast-iron or some other suitable material.

I is an inlet-passage communicating with the annular space W.

Secured to the base H and projecting upward are two posts L and L'. At their upper extremities they are secured by nuts *l* or other suitable means to a transverse yoke N, provided with a central threaded aperture to engage with a vertical screw *k*, provided at its upper end with a hand-wheel K or some other means for securing its rotation. At the lower end of the screw *k* is secured a cover-plate G, adapted to rotate horizontally by means of a packing-ring or ball-bearing *k'*, embraced by grooves in the cover and shank *k''* of the screw. The cover fits water-tight by means of gaskets on the top of the drum R and also on the top of the uppermost boss B to the top filtering elements.

The method of assembling the form of filter as described is as follows: The filter layers are formed outside of the filter in a suitable mold. The lower layer is first made, then the screen C, hub B are placed in position, and the upper layer is formed on top of the screen C. The forming of the pulp mass M may be done by means known in the art, which consist in dissolving the filter mass to a thin soup, using a cylindrical external mold of the largest diameter of the filtering layer and an internal central mold of the smallest diameter of the filtering layer, and expressing the water out of this thin mass by means of a top press-plate fitting between the ring-shaped space between the two cylindrical molds. The diameter of the screen C being less than the filtering layers and the pulp of the upper filter layer being wet when poured on the lower filter layer and dissolving the latter somewhat when poured in, the two layers on each side of the screen C will be interlaced in an annular area of contact, as shown in the drawings. After the two filtering layers are interlaced they are covered with a dividing-screen E, and this constitutes one filtering element. To place the screens together, one of the screens E is first placed on the base-plate H. Then the filter element, as formed above, is placed above it. Then another filter element formed in the same manner is placed above that until they are all placed in position. This position is indicated by Fig. 1. It remains now to close the filter, which is done by swinging the transverse yoke N in position and forcing the screw downward by means of the hand-wheel K. The height of the hubs together must be exactly the height of the external drum R, as shown in Fig. 1, whereupon the cover G will close the hubs and drum simultaneously.

What I claim as my invention, and desire to secure by Letters Patent, is—

1. The combination with a series of superimposed filter elements resting upon a base, of an external drum, a cover adapted to fit snugly over the drum, swing-support for cover attached to the filter, and the same means for simultaneously forcing the cover downward and upon the drum and filter elements.

2. The combination with a series of superimposed filter elements having central intercommunicating openings, of a base, an external drum, and a cover in contact with the uppermost filter elements and sealing the drum.

3. The combination with a series of superimposed filter elements resting upon a base, provided with an inlet and outlet passage registering with similar passages in each filter element, of an external drum, of a framework supported from the base, a yoke carried thereby, a cover adapted to fit snugly on top of the uppermost filter elements and drum and secured to the yoke, and means for forcing the cover downward.

4. The combination with a series of superimposed filter elements resting upon a base, provided with inlet and outlet passages registering with similar passages in each filter element, of an external drum, of a framework supported from the base, a yoke carried thereby, a cover adapted to fit snugly on top of the uppermost filter element and drum and secured to the yoke, and means for forcing the cover downward consisting of a screw adapted to rotate in a threaded aperture in said yoke, and means for producing such rotation.

5. In a filter, the combination with a drum or casing, of circular filter layers of compressed pulp, pairs of which are interlaced with each other in an annular area at their periphery, said filter layers of a diameter somewhat smaller than the casing, whereby clear space is produced not obstructed by any other part of the filter, for circulation of the liquid between the inside of the casing and the peripheral fibers of the filter mass.

6. The combination of a drum or casing with inlet and outlet openings, of circular filter layers of compressed pulp of a diameter somewhat smaller than the casing, pairs of said filter layers being connected at their periphery so as to prevent the passage of unfiltered liquid through the place of connection, embedding between themselves a liquid-conductor, centrally and rigidly supported by means affording a communicating passage between all of said liquid-conductors and the outlet-opening in the casing.

7. In a filter, the combination with a casing or drum containing a series of superimposed filter elements having central intercommunicating openings, of the same means for sealing the drum and bearing upon the filter elements.

8. The combination with a series of superimposed filter elements having central intercommunicating openings, of an external drum and cover in contact with the uppermost filter elements and sealing the drum.

9. The combination with a series of superimposed filter elements having central intercommunicating openings, of an external drum, a screw arrangement for simultaneously forcing the cover downward upon the drum, and bearing upon the filter elements.

10. The combination with a series of superimposed filter elements resting upon a base, of an external drum, of upright posts secured to said base, a transverse yoke supported by said posts, a cover for the filter suspended from the yoke, and means for forcing the cover downward.

11. The combination with a series of superimposed filter elements, resting upon a base, of an external drum, and a cover adapted to fit snugly over the drum, means for supporting the cover consisting of a screw, a yoke with which the screw engages and which is supported from the framework of the apparatus, and means centrally arranged to force the screw downward.

12. The combination with a series of superimposed filter elements resting upon a base, of an external drum, and a cover adapted to fit snugly over the drum, means for supporting the cover when not in use and means for forcing the same downward upon the drum and filter elements, consisting of a screw operated by a hand-wheel.

13. The combination with a series of superimposed filter elements resting upon a base, of a drum surrounding said filter elements, of upright posts secured to said base, a transverse yoke supported by said posts, a cover for the filter suspended from the yoke, and means for forcing the cover downward.

14. The combination with a series of superimposed filter elements resting upon a base, of a drum surrounding said filter elements, of upright posts secured to said base, a transverse yoke supported by said posts, a cover for the filter, and means for forcing the cover downward upon drum and elements simultaneously.

15. The combination with a base-plate provided with suitable inlet and outlet passages, a series of superimposed filter elements resting thereon, upright posts secured to said base-plate, a surrounding drum, and a cover adapted to be swung away from filter elements.

16. The combination with a series of superimposed filter elements resting upon a base, of an external drum, and a cover adapted to fit snugly over the drum, means for supporting the cover consisting of a screw, a yoke with which the screw engages and which is supported from the framework of the apparatus, and means centrally arranged to force the screw downward consisting of a hand-wheel.

17. The combination with a series of superimposed filter elements resting upon a base, of an external drum, of upright posts secured to said base, a transverse yoke supported by said posts, of a cover for the filter suspended from the yoke and means for forcing the cover downward consisting of a screw adapted to rotate in a threaded aperture in said yoke, and means for producing such rotation.

18. The combination with a series of superimposed filter elements resting upon a base, of an external drum, of upright posts secured to said base, a transverse yoke hinged to one of said posts and provided with means for fastening it to another of said posts, a cover for the filter suspended from said yoke, and means for forcing the cover downward against the uppermost filter element and drum.

19. The combination with a series of superimposed filter elements, resting upon a base provided with an inlet and outlet passage registering with similar passages in each filter element, of an external drum, of a framework supported from the base, a yoke carried thereby, a cover adapted to fit snugly on top of the uppermost filter element and drum and secured to the yoke, and means for forcing the cover downward.

20. The combination with a series of superimposed filter elements resting upon a base, provided with inlet and outlet passages registering with similar passages in each filter element, of an external drum, of a framework supported from the base, a yoke carried thereby, a cover adapted to fit snugly on top of the uppermost filter element and drum and secured to the yoke, and means for forcing the cover downward consisting of a screw adapted to rotate in a threaded aperture in said yoke, and means for producing such rotation.

21. The combination of a series of superimposed filter elements, each consisting of layers of filter mass, inlet and outlet fluid-ways consisting of woven-wire screens supported from a central hub, said fluid-ways communicating with passages within said hub, with an external drum, with a base upon which the filter elements rest, said base being provided with inlet and outlet passages communicating with the similar passages in the hubs, a framework supported from the base, a cover carried thereby and adapted to fit snugly upon the uppermost filter element and drum, and means centrally placed to force the cover thereon.

22. The combination with a series of superimposed filter elements resting upon a base, a drum surrounding said filter elements, of upright posts secured to said base, a transverse yoke hinged to one of said posts, and provided with means for fastening it to another of said posts, a cover for the filter suspended from said yoke and means for forcing the cover downward against the uppermost filter element and drum.

23. The combination with a series of superimposed filter elements resting upon a base, provided with an inlet and outlet passage registering with similar passages in each filter element, of a drum surrounding said filter elements, and of a framework supported from the base, a yoke carried thereby, a cover adapted to fit snugly on top of the uppermost filter element and drum and secured to the yoke, and means for forcing the cover downward.

24. The combination of a series of superimposed filter elements, each consisting of layers of filter mass and provided with an outlet fluidway consisting of woven-wire screens embedded with the filter layers and supported from a central hub with the interior of which it communicates and inlet fluid-ways consisting of woven-wire screens placed on each side of the filter layers and extending to the edges thereof, of an external drum, with a baseplate having a main outlet communicating with the interior of the hubs, a main inlet communicating with a space between the outer surfaces of the filter layers and an external drum also supported from the base-plate, with a framework supported from the base, a cover carried thereby and adapted to fit snugly upon the uppermost filter element and the rim of the drum and means adapted to force the cover thereon.

Witness my hand, this 1st day of May, 1903, at the city of Cincinnati, in the county of Hamilton and State of Ohio.

KARL KIEFER.

Witnesses:
H. L. RAMBEAU,
G. W. WERDEN.